United States Patent
Ogawa et al.

(10) Patent No.: US 6,203,883 B1
(45) Date of Patent: Mar. 20, 2001

(54) BIAXIALLY ORIENTED LAMINATED POLYESTER FILM FOR MAGNETIC RECORDING MEDIUM

(75) Inventors: Tatsuya Ogawa; Hideaki Watanabe, both of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/117,733

(22) PCT Filed: Dec. 2, 1997

(86) PCT No.: PCT/JP97/04395

§ 371 Date: Aug. 5, 1998

§ 102(e) Date: Aug. 5, 1998

(87) PCT Pub. No.: WO98/25766

PCT Pub. Date: Jun. 18, 1998

(51) Int. Cl.$^7$ ............... B32B 27/08; B32B 27/20; B32B 27/36

(52) U.S. Cl. ............... 428/141; 428/213; 428/215; 428/339; 428/323; 428/327; 428/328; 428/329; 428/330; 428/331; 428/480; 428/694 SG; 428/694 ST; 428/910

(58) Field of Search ................... 428/641, 213, 428/215, 480, 910, 694 SG, 694 ST, 323, 327, 328, 329, 330, 331, 339

(56) References Cited

U.S. PATENT DOCUMENTS

| 5,336,079 | 8/1994 | Okazaki et al. | 428/323 |
| 5,458,964 | 10/1995 | Okazaki | 428/323 |
| 5,516,574 | 5/1996 | Ogawa et al. | 428/143 |

FOREIGN PATENT DOCUMENTS 06313052  8/1994  (JP).

*Primary Examiner*—Vivian Chen
(74) *Attorney, Agent, or Firm*—Sughrue, Mion, Zinn, Macpeak & Seas, PLLC

(57) ABSTRACT

The film of the present invention is a biaxially oriented laminated polyester film for magnetic recording medium consisting of a polyester layer A containing fine particles and laminated to at least one surface of a polyester layer B, wherein the fine particles in the polyester layer A are composed of 0.001 to 0.03% by weight of crosslinked polymer particles (a) having an average particle diameter (da) of 0.9 to 1.6 $\mu$m, 0.1 to 0.8% by weight of inert particles (b) having an average particle diameter (db) of 0.4 to 0.8 $\mu$m and 0.05 to 1.0% by weight of inert inorganic particles (c) having an average particle diameter (dc) of 0.01 to 0.3 $\mu$m and a Mohs hardness of 7 or above, and the ratio of the thickness TA ($\mu$m) of the polyester layer A to the average particle diameter da ($\mu$m) of the crosslinked polymer particle (TA/da) is in the range of from 0.4 to 2.0. The film has excellent windability, abrasion resistance, transportation durability and electromagnetic conversion characteristics and is producible at a low production cost and useful especially as a base film of a magnetic recording medium for high-speed duplicator.

15 Claims, 1 Drawing Sheet

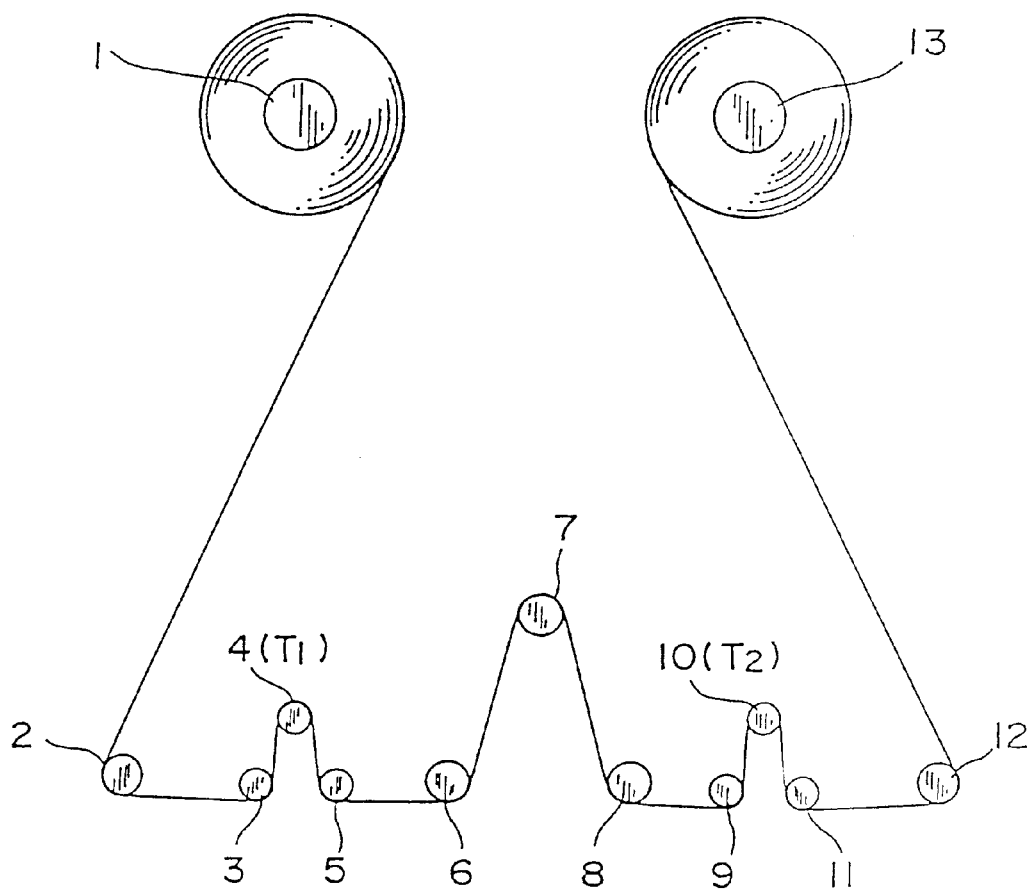

BIAXIALLY ORIENTED LAMINATED POLYESTER FILM FOR MAGNETIC RECORDING MEDIUM

DETAILED DESCRIPTION OF THE INVENTION

1. Technical Field

The present invention relates to a biaxially oriented laminated polyester film for magnetic recording medium. More particularly, it relates to a biaxially oriented laminated polyester film for magnetic recording medium, having excellent windability, abrasion resistance and durability in transportation as well as electromagnetic conversion characteristics, producible at a low production cost, and useful especially as a base film of a magnetic recording medium for a high-speed duplicator.

2. Background Arts

Biaxially oriented polyester films represented by polyethylene terephthalate film are being widely used as a base film of a magnetic recording medium such as a magnetic tape owing to their excellent physical and chemical properties.

The growth of the production of tapes recorded with information such as cinema picture is remarkable recently among various uses of magnetic tapes. The production of recorded tapes was carried out formerly by duplicating from a master VTR (video tape recorder) to several thousands of VTRs at a high speed, however, a new duplication technology has been developed recently which comprises the superposition of a blank magnetic tape to a mirror master tape recorded with the above information and the application of a magnetic field and heat to transfer the information to the blank tape. The duplication speed of the method is extremely high. Accordingly, the required characteristics for the magnetic tape are varied, and various new required characteristics have been developed for the base film of the tape for the high-speed duplication use. For example, the tape is required to have improved windability in the form of a magnetic tape in the high-speed winding, close contact to the master tape, smoothness of the film surface to improve the electromagnetic conversion characteristics and abrasion resistance with a guide tape contacting with the tape in duplication.

The conventional base film of magnetic recording medium is incorporated with inert particles having large diameter to improve the windability by improving the air-squeezing performance. The addition of a large amount of such inert particles having large diameter to a base film forms protrusions on the surface of the magnetic layer by the particles, and the transfer of the profile of the protrusions formed by the large-diameter inert particle to the magnetic layer surface in the case of winding the tape in overlapped state to remarkably deteriorate the surface properties of the magnetic layer of the magnetic tape. There are other problems such as the abrasion of the coarse inert particles by contacting with the guide roll to generate white powder and cause drop-out defects.

The environment against the abrasion resistance and transport durability of magnetic tapes tends to be severe owing to e.g. the use of roughly surface-finished cassette half and guide pin or the use of a plastic guide pin to reduce the cost of a magnetic recording and playing apparatus such as VTR, add the improvement for meeting the requirements is still more keenly desired.

DISCLOSURE OF THE INVENTION

As a result of vigorous investigation for achieving the new characteristics required as a base film of a magnetic tape for the aforementioned high-speed duplicator, i.e. the improvement on the windability at a high speed, the smoothness of the film surface and the abrasion resistance, etc., and for solving the problems to improve the abrasion resistance and the transportation durability so as to be usable even on an inferior cassette half, guide pin, etc., the inventors of the present invention have found that the above problems can be solved by using a laminated polyester film, adding three specific kinds of particles to the outermost layer constituting at least one of the surfaces and selecting the ratio of the thickness of the outermost layer to the diameter of the particle having the largest average particle diameter to be fallen within a specific range and that a biaxially oriented laminated polyester film having extremely excellent total performance and producible at a low cost can be produced by this process.

The object of the present invention is to provide a biaxially oriented laminated polyester film for a magnetic recording medium having excellent windability, abrasion resistance, transportation durability and electromagnetic conversion characteristics, producible at a low cost and useful as a base film of a magnetic recording medium for high-speed duplicators.

The other objects and advantages of the present invention will become clear from the following explanations.

The object of the present invention is achieved by a biaxially oriented laminated polyester film for magnetic recording medium comprising a biaxially oriented polyester film having a polyester layer A containing fine particles laminated to at least one surface of a polyester layer B and characterized in that the fine particles in the polyester layer A are composed of 0.001 to 0.03% by weight of crosslinked polymer particles (a) having an average particle diameter (da) of 0.9 to 1.6 $\mu$m, 0.1 to 0.8% by weight of inert particles (b) having an average particle diameter (db) of 0.4 to 0.8 $\mu$m and 0.05 to 1.0% by weight of inert inorganic particles (c) having an average particle diameter (dc) of 0.01 to 0.3 $\mu$m and a Mohs hardness of 7 or above and that the ratio of the thickness TA ($\mu$m) of the polyester layer A to the average particle diameter da ($\mu$m) of the crosslinked polymer particles (a) TA/da is from 0.4 to 2.0.

BRIEF EXPLANATION OF THE DRAWING

FIG. 1 is a schematic diagram of an apparatus for the measurement of kinetic friction coefficient. In the FIG. 1, the sign 1 is a feed reel, 2 is a tension controller, 3,5,6,8,9 and 11 are free rollers, 4 is a tension detector (inlet side), 7 is a stationary rod, 10 is a tension detector (outlet side), 12 is a guide roller and 13 is a take-up reel.

BEST MODE FOR CARRYING OUT THE INVENTION

The biaxially oriented laminated polyester film of the present invention is necessary to have the above-mentioned characteristics.

In the present invention, the polyester is a saturated aromatic polyester produced by using an aromatic dicarboxylic acid as a main dicarboxylic acid component and an aliphatic glycol as a main glycol component. The polyester is an essentially linear polymer and capable of forming a film especially by melt-forming.

The aromatic dicarboxylic acid is e.g. terephthalic acid, naphtahlenedicarboxylic aid, isophthalic acid, diphenoxyethane dicarboxylic acid, diphenyldicarboxylic acid, diphenyl ether dicarboxylic acid, diphenylsulfone dicarboxylic acid, diphenyl ketone dicarboxylic acid and anthracenedicarboxylic acid and the aliphatic glycol is e.g. a polymethylene glycol having a carbon number of from 2 to 10 such as ethylene glycol, trimethylene glycol, tetramethylene glycol, pentamethylene glycol, hexamethylene glycol and decamethylene glycol, an aliphatic diol such as cyclohexane-dimethanol, etc.

In the present invention, the polyester is preferably a polymer having an alkylene terephthalate and/or an alkylene-2,6-naphthalate as a main constituent component.

Especially preferable polyesters among the above polyesters are polyethylene terephthalate, polyethylene-2,6-naphthalate and a copolymer containing terephthalic acid or 2,6-naphthalene-dicarboxylic acid accounting for not less than 80 mol % of the total dicarboxylic acid component and ethylene glycol accounting for not less than 80 mol % of the total glycol component. In this case, less than 20 mol % of the total acid component may be the above aromatic dicarboxylic acid other than terephthalic acid or 2,6-naphthalenedicarboxylic acid, an aliphatic dicarboxylic acid such as adipic acid or sebacic acid or an alicyclic dicarboxylic acid such as cyclohexane-1,4-dicarboxylic acid, etc. Less than 20 mol % of the total glycol component may be the above glycols other than ethylene glycol or an aromatic diol such as hydroquinone, resorcin or 2,2-bis(4-hydroxyphenyl)propane, an aliphatic diol having aromatic ring such as 1,4-dihydroxydimethylenebenzene, a polyalkylene glycol (polyoxyalkylene glycol) such as polyethylene glycol, polypropylene glycol or polytetramethylene glycol, etc.

Included in the polyesters of the present invention are polymers copolymerized or bonded with not more than 20 mol % of a component derived from an oxycarboxylic acid, for example, an aromatic oxy acid such as hydroxybenzoic acid or an aliphatic oxy acid such as ω-hydroxycaproic acid based on the total amount of the dicarboxylic acid component and the oxycarboxylic acid component.

The polyester of the present invention includes a copolymer copolymerized with three or more functional polycarboxylic acid or polyhydroxy compound such as trimellitic acid or pentaerythritol in an amount to get an essentially linear polymer, for example, 2 mol % or less based on the total acid component.

The above polyesters are known in itself and producible by known processes.

The biaxially oriented laminated polyester film of the present invention is composed of a polyester layer A laminated to at least one surface of a polyester layer B. The laminate preferably has a double-layer structure consisting of layer A/layer B or a triple-layer structure consisting of layer A/layer B/layer A, however, the triple-layer structure is more preferable because the recovered scrap film generated in the polyester film manufacturing process can be reused as or blended to the polyester film layer B.

The above-mentioned polyester can be used as the polyester for the layer A and the layer B. The polyesters of the layer A and the layer B may be the same or different and the use of the same polyesters is preferable.

The polyester layer A of the biaxially oriented laminated polyester film of the present invention contains three kinds of inert particles (a), (b) and (c) having different average particle diameters at the same time.

The inert particle (a) is a crosslinked polymer particle having an average particle diameter (da) falling within the range of 0.9 to 1.6 μm and its content is in the range of 0.001 to 0.03% by weight. When the average particle diameter (da) and the content of the particle (a) are smaller than the above ranges, the improving effect on the windability of the film becomes insufficient. On the contrary, when the average particle diameter (da) and the content are larger than the above ranges, the electromagnetic conversion characteristics of the produced magnetic tape and the abrasion resistance of the film are deteriorated to undesirable levels. The average particle diameter (da) of the particle (a) is preferably in the range of 1.0 to 1.5 μm, more preferably in the range of 1.1 to 1.4 μm. The content of the particle (a) is preferably in the range of 0.003 to 0.025% by weight, more preferably in the range of 0.005 to 0.02% by weight.

The crosslinked polymer particle (a) is preferably at least one kind of particle selected from crosslinked silicone resin particle and crosslinked polystyrene resin particle because these resins have high affinity to polyester and the particle is soft to easily absorb the shock applied to protrusions and to resist the falling off of the protrusion by the collision at a high speed.

The crosslinked polymer particle (a) preferably has an apparent Young's modulus of the particle of 10 to 100 kg/mm$^2$, more preferably 10 to 50 kg/mm$^2$. When the apparent Young's modulus is smaller than 10 kg/mm$^2$, the particles incorporated in the film are deformed by the stress in the drawing process to fail in getting high protrusions necessary for imparting the film with windability. On the contrary, the particle becomes too hard to keep the desirable impact strength and is liable to be fallen off when the apparent Young's modulus exceeds 100 kg/mm$^2$.

The inert particle (b) has an average particle diameter (db) of from 0.4 to 0.8 μm and its content is in the range of 0.1 to 0.8% by weight. When the average particle diameter (db) and the content of the particle are smaller than the above ranges, the slipperiness of the film becomes poor to make the winding of the film difficult and cause unstable transportation of the tape in a VTR. On the contrary, the abrasion resistance is deteriorated when these values are larger than the above ranges. The average particle diameter (db) of the inert particle (b) is preferably in the range of 0.4 to 0.7 μm, more preferably in the range of 0.4 to 0.6 μm. The content of the inert particle (b) is preferably in the range of 0.15 to 0.7% by weight, more preferably in the range of 0.2 to 0.6% by weight.

The inert particle (b) is an inorganic particle and the preferable examples are (1) silicon dioxide (including hydrated silicon dioxide, silica sand, quartz, etc.), (2) alumina having various crystal morphology, (3) a silicate having an SiO$_2$ content of 30% by weight or more (e.g. amorphous or crystalline clay mineral, aluminosilicate (including calcined material and hydrated material), chrysotile, zircon or fly ash), (4) oxide of Mg, Zn, Zr or Ti, (5) sulfate of Ca or Ba, (6) phosphate of Li, Ba or Ca (including monohydrogen salt and dihydrogen salt), (7) benzoate of Li, Na or K, (8) terephthalate of Ca, Ba, Zn or Mn, (9) titanate of Mg, Ca, Ba, Zn, Cd, Pb, Sr, Mn, Fe, Co or Ni, (10) chromate of Ba or Pb, (11) carbon (e.g. carbon black or graphite), (12) glass (e.g. glass powder or glass beads), (13) carbonate of Ca or Mg, (14) fluorite and (15) Zn. Calcium carbonate is most preferable among the above materials.

The inert particle (c) is an inert inorganic particle having a Mohs hardness of 7 or above and an average particle diameter (dc) of 0.01 to 0.3 μm. The content of the particle (c) is in the range of 0.05 to 1.0% by weight. An inert inorganic particle (c) having a Mohs hardness of smaller than 7 is undesirable because of its insufficient scratch resistance. The inert inorganic particle having a Mohs hardness of 7 or above is preferably an agglomerated particle composed of aluminum oxide (alumina) or spinel-type oxide and having an average agglomeration degree of 2 to 20. The scratch resistance of the film becomes undesirably poor when the average agglomeration degree is out of the above range. The average agglomeration degree is preferably in the range of 2 to 15, more preferably 2 to 10 and most preferably 2 or above and less than 5 from the viewpoint of the improving effect on the scratch resistance. When the inert inorganic particle (c) is an agglomerated particle composed of aluminum oxide (alumina), the particle preferably has θ-type crystal structure to increase the effect for improving the scratch resistance. When the inert inorganic particle (c) is a spinel-type oxide, it is preferably $MgAl_2O_4$ to increase the scratch resistance improving effect.

When the average particle diameter (dc) and the content of the inert inorganic particle (c) are smaller than the above ranges, the improving effect on the scratch resistance becomes undesirably insufficient. On the contrary, the use of the particle having these values exceeding the above ranges is also unfavorable because of insufficient scratch resistance improving effect and deteriorated abrasion resistance. The average particle diameter (dc) of the inert inorganic particle (c) is preferably within the range of from 0.03 to 0.25 $\mu$m, more preferably from 0.05 to 0.2 g m. The content of the particle (c) is preferably within the range of from 0.1 to 0.7% by weight, more preferably from 0.15 to 0.4% by weight and most preferably 0.2% by weight or above and less than 0.25% by weight.

The biaxially oriented laminated polyester film of the present invention is necessary to have a TA/da ratio falling within the range of from 0.4 to 2.0, wherein TA ($\mu$m) is the thickness of the polyester layer A and da ($\mu$m) is the average particle diameter of the crosslinked polymer particle (a). When the TA/da ratio is smaller than the above range, the falling-off of the particle is liable to occur to deteriorate the abrasion resistance. On the contrary, the film having the ratio larger than the above range has deteriorated electromagnetic conversion characteristics owing to the roughening of the film surface by the influence of particles (a) existing in a layer deeper than twice the particle diameter. The value of the TA/da ratio is preferably within the range of from 0.6 to 1.9, more preferably from 0.8 to 1.8.

The polyester layer B of the biaxially oriented laminated polyester film of the present invention is not necessary to contain inert particles, however, it is preferable that the layer B contains inert particles having an average particle diameter of 0.4 $\mu$m or above, such as the aforementioned crosslinked polymer particle (a), inert particles (b), etc., in an amount (CB) satisfying the following formula to enable the reclamation and use of the scrap film generated in the polyester film manufacturing process for the production of the layer B.

$$CB = CA \times \frac{dA}{dB} \times \frac{R}{1-R}$$

wherein CA is the content (% by weight) of inert particles having an average particle diameter of 0.4 $\mu$m or above in the polyester layer A, CB is the content (% by weight) of inert particles having an average particle diameter of 0.4 $\mu$m or above in the polyester layer B, dA is the total thickness ($\mu$m) of the polyester layer A, dB is the total thickness ($\mu$m) of the polyester layer B and R is a number of from 0.3 to 0.07.

When the value R of the above formula is larger than 0.7 or smaller than 0.3, the variation of the content of inert particles having an average particle diameter of 0.4 $\mu$m or above in the polyester layer B becomes large and, consequently, the variation of the surface roughness of the polyester layer A is also increased. The preferable value of R is between 0.4 and 0.6. Fine inert particles having an average particle diameter of 0.4 $\mu$m or under gives little influence on the surface of the polyester layer A even if the particles are present in the polyester layer B.

The center-line average roughness RaA of the surface of the polyester layer A of the biaxially oriented laminated polyester film of the present invention is preferably 8 to 18 nm, more preferably 9 to 17 nm and especially 10 to 16 nm. When the center line average roughness RaA is smaller than 8 nm, the surface is too smooth to give sufficient improving effect on the windability and the transportation durability and when it is larger than 18 nm, the electromagnetic conversion characteristics of the magnetic tape manufactured from the film is deteriorated owing to excessive roughness of the surface.

The biaxially oriented laminated polyester film of the present invention has a windability index of preferably 100 or below at a winding speed of 200 m/min. The film having a windability index of 100 or below is preferable because of remarkable improving effect on the windability in the case of using the film as a base film of a tape for a high-speed duplicator. On the contrary, a film having a windability index of larger than 100 is undesirable because the film gives a wound roll having an unsatisfactory shape such as rugged side face of the film roll and, in extreme cases, roll collapse may occur during the winding operation. The windability index at a winding speed of 200 m/min is more preferably 85 or below, especially 70 or below.

The biaxially oriented laminated polyester film of the present invention has a total film thickness of preferably 5 to 25 $\mu$m, more preferably 10 to 20 $\mu$M.

The Young's modulus of the film in longitudinal direction is preferably 400 kg/mm$^2$ or above, more preferably 450 kg/mm$^2$ or above and preferably not larger than 600 kg/mm$^2$. The Young's modulus in lateral direction is preferably 500 kg/mm$^2$ or above, more preferably 600 kg/mm$^2$ or above and preferably not larger than 800 kg/mm$^2$. A film having longitudinal and lateral Young's moduli falling within the above ranges is preferable because such film can sufficiently cope with the reduction of the film thickness required for a long-playing tape.

The biaxially oriented polyester film of the present invention can be manufactured principally by a known process or a process accumulated in the industry. For example, it can be manufactured by producing a laminated undrawn film and biaxially orienting the film. The laminated undrawn film can be produced by a laminated film production process accumulated in the industry. For example, the laminated undrawn film can be produced by laminating a surface-forming film layer (polyester layer A) to a core-forming film layer (polyester layer B) in molten state or in a cooled and solidified state. Concretely, it can be produced by coextrusion, extrusion lamination, etc.

The laminated undrawn film produced by the above process can be converted to a biaxially oriented film by a process accumulated in the industry for the production of a biaxially oriented film. For example, a laminated undrawn film is drawn in one direction (longitudinal direction or lateral direction) at a draw ratio of 3.0 to 4.0 and a temperature between Tg −10° C. and Tg +70° C. (Tg is the glass transition temperature of the polyester) and further drawing in a direction perpendicular to the first drawing direction (when the film is drawn in longitudinal direction at the first stage, the second stage drawing is in lateral direction) at a draw ratio of 3.6 to 4.5 and a temperature between Tg° C. and Tg+70° C. The draw ratio in each direction is preferably selected to give a Young's modulus satisfying the aforementioned requirement and the areal draw ratio is preferably selected within the range of from 13 to 18. The drawing can be carried out by simultaneous biaxial drawing or a consecutive biaxial drawing. The biaxially oriented film may be heat-treated at a temperature between (Tg+70)° C. and Tm° C. For example, a laminated polyethylene terephthalate film is preferably heat-set at 190 to 230° C. The heat-setting time is e.g. 1 to 60 seconds.

Since the biaxially oriented polyester film of the present invention contains three specific kinds of particles in the outermost layer constituting at least one of the surfaces and the ratio of the thickness of the outermost layer to the particle diameter of the particle having largest particle diameter is selected to be fallen in a specific range, it is a film extremely useful for a magnetic recording use, having excellent performance comprising improved high-speed windability required as a base film of a magnetic recording medium for high-speed duplicator, smoothness of the base surface and abrasion resistance as well as improved abrasion resistance and transportation stability on a roughly surface-finished cassette half and guide pin, etc., producible at a low cost and having excellent total performance.

Various physical properties and characteristics referred in the specification of the present invention were measured and defined by the following methods.

(1) Average particle diameter (dp) of particle

The average particle diameter was measured by using a Centrifugal Particle Size Analyzer Type CP-50 manufactured by Shimadzu Corp. A cumulative curve between the particle diameter and the amount of the particle was drawn based on the obtained centrifugal precipitation curve, and the particle diameter corresponding to 50 mass % was read from the cumulative curve and used as the average particle diameter ("Particle Size Measuring Technique", a monograph published by Nikkan Kogyo Shimbun Ltd., 1975, pp.242–247).

(2) Apparent Young's modulus of particle

A diamond indenter was lowered at a constant loading rate (29 mgf/sec) by an ultramicro-compression tester MCTM-201 manufactured by Shimadzu Corp. to apply an external force to a single particle. The apparent Young's modulus Y was calculated from the load (kgf) at the breakage of the particle, the displacement Z (mm) of the indenter at the breakage of the particle and the particle diameter d (mm) according to the following formula. Similar operations were repeated 10 times and the average of the ten data was adopted as the apparent Young's modulus of the particle.

$$Y=2.8P/\pi dZ$$

(3) Average agglomeration degree of particle

A particle-containing film was sliced in the direction of cross-section to obtain an ultra-thin slice of 100 nm thick. The particles in the slice were observed with a transmission electron microscope (e.g. JEM-1200EX manufactured by JEOL Ltd.) to find undividable smallest particles (primary particles). The number of primary particles constituting each of the agglomerated particles (secondary particles) were counted on 100 particles from the observation photograph and the total number of the primary particles was divided by the number of the observed secondary particles to get the average agglomeration degree.

(4) Surface roughness (Ra) of film

Center-line average roughness (Ra) defined by JIS B0601 was measured by a tracer-type surface roughness tester of Kosaka Kenkyusho Ltd. (SURFCORDER SE-30C) under the following conditions.

(a) Tip radius of the tracer: 2 $\mu$m (b) Measuring pressure: 30 mg (c) Cut-off: 0.25 mm (d) Measuring length: 2.5 mm (e) Processing of the data: Measurements were repeated 6 times on the same specimen, the largest one was omitted from the data and the average of the remaining 5 data was used as the surface roughness.

(5) Calender abrasivity

The abrasivity of the transporting face of a base film was estimated by using a three-stage miniature super-calender. The calender had three-stages comprising nylon rolls and steel rolls and the film was transported at a film speed of 100 m/min and calendered at a calendering temperature of 80° C. under a linear pressure of 200 kg/cm. The abrasivity of the base film was estimated by the stain attached to the top roller of the calender after transporting 4,000 m of the film in total.

<5-stage judgement>

Class 1: Absolutely no contamination of nylon roll

Class 2: Little contamination of nylon roll

Class 3: Some contamination on nylon roll easily erasable by rubbing with dry cloth Class 4: Contamination of nylon roll scarcely erasable with dry cloth but erasable with a solvent such as acetone Class 5: Considerable contamination of nylon roll scarcely removable with solvents (6) Blade abrasion resistance An edge of a blade (blade for an industrial blade tester manufactured by GKI, U.S.A.) was perpendicularly applied to a film cut to 1/2 inch wide and pressed into the film to the depth of 2 mm and the film was transported (under friction) at a speed of 100 m/min under an inlet tension Ti of 50 g in an environment of 20° C. and 60% relative humidity. The abrasion resistance was estimated by the amount of abraded powder attached to the blade after the transportation of 100 m of the film.

<Judgement>

⊚: The width of abraded powder attached to the edge of the blade is smaller than 0.5 mm ○: The width of abraded powder attached to the edge of the blade is 0.5 mm or above and smaller than 1.0 mm.

Δ: The width of abraded powder attached to the edge of the blade is 1.0 mm or above and smaller than 2.0 mm.

X: The width of abraded powder attached to the edge of the blade is 2.0 mm or above.

(7) Scratch resistance and abrasion resistance under high-speed transportation

These properties were measured by the following method using the apparatus shown in the FIG. 1.

In the FIG. 1, the sign 1 is a feed reel, 2 is a tension controller, 3,5,6,8,9 and 11 are free rollers, 4 is a tension detector (inlet side), 7 is a stationary rod, 10 is a tension detector (outlet side), 12 is a guide roller and 13 is a take-up reel.

A film slit to a width of ½ inch was brought into contact with the stationary rod 7 at a contacting angle θ of 60°, and 200 m of the film was transported in an environment of 20° C. and 60% humidity at a speed of 300 m/min while keeping the inlet-side tension to 50 g.

The abraded powder attached to the stationary rod 7 and the scratch on the film formed after the transportation were observed to estimate the scratch resistance and the abrasion resistance.

There are three methods according to the kinds of the stationary rod. The method A uses a thoroughly polished 6φ tape guide made of SUS304 (surface roughness Ra=0.015 μm), the method B uses a 6φ tape guide produced by bending a sintered SUS plate in cylindrical form and having insufficiently finished surface (surface roughness Ra=0.15 μm), and the method C uses a 6φ tape guide made of a polyacetal containing carbon black.

<Judgement of abraded powder>

⊚: Abraded powder is absolutely unobservable.

○: Abraded powder is faintly observable.

Δ: The presence of abraded powder is clearly observable.

X: Considerable amount of powder is attached to the rod.

<Judgement of scratch resistance>

⊚: Scratch is absolutely unobservable.

○: One to five scratches are observable.

Δ: Six to fifteen scratches are observable.

X: The number of observable scratches is 16 or more.

(8) Kinetic friction coefficient (μk) and scratch resistance at repeated low-speed transportation These properties were measured by the following method using the apparatus shown in the FIG. 1.

The non-magnetic face of a magnetic tape was brought into contact with the stationary rod 7 at an angle θ=(152/180)π radian (152°) and transported (under friction) at a speed of 200 cm/min in an environment of 20° C. and 60% relative humidity. The tension controller 2 was controlled to adjust the inlet-side tension T1 to 50 g and the outlet-side tension (T2: g) was detected by the outlet-side tension detector after reciprocating the film 50 times. The kinetic friction coefficient μk was calculated by the following formula.

$$\mu k = (2.303/\theta)\log(T2/T1) = 0.868\log(T2/35)$$

When the kinetic friction coefficient (μk) is 0.25 or above, the transportation of the tape becomes unstable when the tape is repeatedly transported in a VTR, and the film having a kinetic friction coefficient exceeding the above value is judged to have poor transportation durability.

There are three methods according to the kinds of the stationary rod. The method A uses a thoroughly polished 6φ tape guide made of SUS304 (surface roughness Ra=0.015 μm), the method B uses a 6φ tape guide produced by bending a sintered SUS plate in cylindrical form and having insufficiently finished surface (surface roughness Ra=0.15 μm), and the method C uses a 6φ tape guide made of a polyacetal containing carbon black.

The scratch resistance of the tape was judged by the following criterion on the scratch of the non-magnetic face of the tape after the transportation test.

<Judgement of scratch resistance>

⊚: Scratch is absolutely unobservable.

◎: One to five scratches are observable.

Δ: Six to fifteen scratches are observable.

X: The number of observable scratches is 16 or more.

The magnetic tape was manufactured by the following method.

One hundred (100) parts by weight (hereinafter abbreviated as parts) of γ-Fe₂O₃ were kneaded with the following composition in a ball-mill for 12 hours.

| | |
|---|---|
| Polyester urethane | 12 parts |
| Vinyl chloride-vinyl acetate-maleic anhydride copolymer | 10 parts |
| α-Alumina | 5 parts |
| Carbon black | 1 part |
| Butyl acetate | 70 parts |
| Methyl ethyl ketone | 35 parts |
| Cyclohexanone | 100 parts. |

After the kneading and dispersing operation, the mixture was further incorporated with

| | |
|---|---|
| A fatty acid: oleic acid | 1 part |
| A fatty acid: palmitic acid | 1 part |
| A fatty acid ester (amyl stearate) | 1 part | and kneaded for 10 to 30 minutes. The mixture was added with 7 parts of 25% ethyl acetate solution of a triisocyanate compound and subjected to high-speed shearing dispersion treatment for 1 hour to obtain a magnetic coating liquid.

The obtained coating liquid was applied to a polyester film in an amount to get a dried film thickness of 3.5 μm.

The coated film was oriented in a DC magnetic field and dried at 100° C. The dried film was calendered and slit to ½ inch width to obtain a magnetic tape.

(9) Windability index

A film of ½ inch wide was passed through the apparatus shown in the FIG. 1 by-passing the stationary rod 7 and 200 m of the film was transported at a speed of 200 m/min in an environment of 20° C. and 60% relative humidity while detecting the edge position of the film with a CCD camera at a position immediately before winding the film on the take-up reel 13.

The fluctuation of the edge position was drawn in the form of wave with time and the windability index was calculated from the wave by the following formula.

$$\text{Windability Index} = \sqrt{\frac{1}{l} \int_0^l f(x)^2 \, dx}$$

wherein l is measurement time (second) and x is the fluctuation (μ_m) of the edge.

(10) Windability

The magnetic tape manufactured by the above method was passed through the apparatus shown in the FIG. 1 by-passing the stationary rod 7 and 500 m of the tape was transported at a speed of 400 m/min. The windability was evaluated by the winding performance at the side of the take-up reel and the roll shape of the wound magnetic tape roll.

<Judgement>

○: The edge displacement of the wound roll is 1 mm or less.

Δ: The edge displacement of the wound roll exceeds 1 mm.

X: The tape is unwindable.

(11) Electromagnetic conversion characteristics

A VTR of VHS-system (BR6400, Victor Company of Japan, Ltd.) was modified, a 4MHz sinusoidal wave was inputted to a recording and reproducing head through an amplifier, recorded on a magnetic tape and reproduced and the reproduced signal was inputted to a spectrum analyzer. The noise generated at the frequency separated from the 4

MHz carrier signal by 0.1 MHz was measured and the carrier-to-noise ratio (C/N) was expressed by dB unit. The magnetic tape produced above was measured by this process, the C/N ratio of the tape manufactured by the Comparative Example 17 was used as the standard (±0 dB) and the difference from the standard magnetic tape was used as the electromagnetic conversion characteristics.

EXAMPLES

The present invention is further described in detail by the following Examples.

Examples 1 to 13 and Comparative Examples 1 to 16

Polyethylene terephthalates for the polyester layer A having an intrinsic viscosity of 0.56 (o-chlorophenol, 35° C.) were produced by polymerizing dimethyl terephthalate and ethylene glycol by conventional method using manganese acetate as a transesterification catalyst, antimony trioxide as a polymerization catalyst, phosphorous acid as a stabilizer and particulate additives for the polyester layer A shown in the Tables 1 and 3 as lubricants.

A polyethylene terephthalate produced by the process same as the above without adding the particles was used as the polymer for the polyester layer B.

Pellets of these polyethylene terephthalate resins were dried at 170° C. for 3 hours, supplied to the hoppers of two extruders, melted at melting temperature of 280 to 300° C., extruded through a multi-manifold coextrusion die on a rotary cooling drum having a surface finish of about 0.3s and a surface temperature of 20° C. in a state laminating the layers A to both surfaces of the layer B to obtain an undrawn laminated film having a thickness of 200 μm.

The undrawn laminated film produced by the above process was preheated at 75° C., drawn 3.2 times between a low-speed roll and a high-speed roll under heating with three IR heaters having a surface temperature of 800° C. and placed 15 mm above the film, supplied to a stenter and drawn 4.3 times in lateral direction at 120° C. The obtained biaxially oriented film was heat-set at 205° C. for 5 seconds to obtain a heat-set biaxially oriented laminated polyester film having a thickness of 14 μm. The film had a longitudinal Young's modulus of 460 kg/mm$^2$ and a lateral Young's modulus of 700 kg/mm$^2$.

The thickness of each layer was adjusted by adjusting the extrusion rates of two extruders and the width of the flow channel and was determined by the fluorescent X-ray analysis in combination with the observation of the boundary on the cross-section of a thinly sliced film with a transmission electron microscope.

Comparative Example 17

A single-layer biaxially oriented polyester film was produced by using a polyethylene terephthalate containing the particles described in the Table 3 by a method similar to the above Examples except for the use of an ordinary single-layer die for extrusion.

The characteristics of the film produced by the process are shown in the Tables 2 and 4. It is apparent from the Tables 2 and 4 that the film of the present invention has extremely excellent overall characteristics comprising the excellent electromagnetic conversion characteristics, windability and abrasion resistance and the excellent scratch resistance, abrasion resistance and transportation durability to various kinds of tape guides.

TABLE 1

| | Inert particle in layer A | | | | | | | |
|---|---|---|---|---|---|---|---|---|
| | Crosslinked polymer particle A | | | Inert particle B | | Inert inorganic particle C | | |
| | Kind of particle, Average particle diameter (da) (μm) | Content of particle (%) | Apparent Young's modulus of particle (kg/mm$^2$) | Kind of particle, Average particle diameter (db) (μm) | Content of particle (%) | Kind of particle, Average particle diameter (dc) (μm) | Content of particle (%) | Average agglomeration degree of particle (number) |
| Example 1 | Silicone resin 1.2 | 0.01 | 50 | Calcium carbonate 0.6 | 0.2 | θ-Aluminum oxide 0.1 | 0.2 | 4.5 |
| Example 2 | Silicone resin 1.2 | 0.02 | 50 | Calcium carbonate 0.6 | 0.2 | θ-Aluminum oxide 0.1 | 0.2 | 4.5 |
| Example 3 | Silicone resin 1.2 | 0.005 | 50 | Calcium carbonate 0.6 | 0.2 | θ-Aluminum oxide 0.1 | 0.2 | 4.5 |
| Example 4 | Silicone resin 1.5 | 0.01 | 50 | Calcium carbonate 0.6 | 0.2 | θ-Aluminum oxide 0.1 | 0.2 | 4.5 |
| Example 5 | Crosslinked polystyrene 1.2 | 0.01 | 25 | Calcium carbonate 0.6 | 0.2 | θ-Aluminum oxide 0.1 | 0.2 | 4.5 |
| Example 6 | Silicone resin 1.2 | 0.01 | 50 | Calcium carbonate 0.6 | 0.2 | Spinel oxide (MgAl$_2$O$_4$) 0.1 | 0.2 | 4.2 |
| Example 7 | Silicone resin 1.2 | 0.01 | 50 | Calcium carbonate 0.6 | 0.2 | θ-Aluminum oxide 0.1 | 0.15 | 4.5 |
| | | | | | | Spinel oxide (MgAl$_2$O$_4$) 0.1 | 0.05 | 4.2 |
| Example 8 | Silicone resin 1.2 | 0.01 | 50 | Calcium carbonate 0.6 | 0.2 | θ-Aluminum oxide 0.1 | 0.2 | 12.4 |
| Example 9 | Silicone resin 1.2 | 0.01 | 50 | Calcium carbonate 0.6 | 0.2 | θ-Aluminum oxide 0.1 | 0.2 | 4.5 |
| Example 10 | Silicone resin 1.2 | 0.01 | 50 | Calcium carbonate 0.6 | 0.2 | θ-Aluminum oxide 0.1 | 0.2 | 4.5 |
| Example 11 | Silicone resin 1.2 | 0.01 | 50 | Calcium carbonate 0.6 | 0.2 | θ-Aluminum oxide 0.1 | 0.2 | 4.5 |

TABLE 1-continued

| | Inert particle in layer A | | | | | | | |
|---|---|---|---|---|---|---|---|---|
| | Crosslinked polymer particle A | | | Inert particle B | | Inert inorganic particle C | | |
| | Kind of particle, Average particle diameter (da) (μm) | Content of particle (%) | Apparent Young's modulus of particle (kg/mm²) | Kind of particle, Average particle diameter (db) (μm) | Content of particle (%) | Kind of particle, Average particle diameter (dc) (μm) | Content of particle (%) | Average agglomeration degree of particle (number) |
| Example 12 | Silicone resin 1.2 | 0.01 | 50 | Calcium carbonate 0.6 | 0.2 | Spinel oxide (MgAl$_2$O$_4$) 0.1 | 0.2 | 4.2 |
| Example 13 | Silicone resin 1.2 | 0.01 | 50 | Calcium carbonate 0.6 | 0.2 | Spinel oxide (MgAl$_2$O$_4$) 0.1 | 0.2 | 4.2 |

TABLE 2

| | Thickness of Layer A (T$_A$) μm | Thickness of Layer B μm | T$_A$/ d$_a$ | Ra$^A$ nm | Calender abrasion resistance (class) | Blade abrasion resistance | High speed transportation | | | | | | Low speed repeated transportation | | | | | | Windability index | Windability | Electromagnetic conversion characteristics C/N |
|---|---|---|---|---|---|---|---|---|---|---|---|---|---|---|---|---|---|---|---|---|---|
| | | | | | | | Scratch resistance | | | Abrasion resistance | | | Scratch resistance | | | Kinetic μk | | | | | |
| | | | | | | | A | B | C | A | B | C | A | B | C | A | B | C | | | |
| Example 1 | 2.0 | 10.0 | 1.7 | 14 | 1 | ⊚ | ⊚ | ⊚ | ⊚ | ⊚ | ⊚ | ⊚ | ⊚ | ⊚ | ⊚ | 0.21 | 0.21 | 0.20 | 60 | ○ | +1.8 |
| Example 2 | 2.0 | 10.0 | 1.7 | 15 | 2 | ○ | ⊚ | ⊚ | ⊚ | ⊚ | ⊚ | ⊚ | ⊚ | ⊚ | ⊚ | 0.20 | 0.20 | 0.19 | 50 | ○ | +1.5 |
| Example 3 | 2.0 | 10.0 | 1.7 | 14 | 1 | ⊚ | ⊚ | ⊚ | ⊚ | ⊚ | ⊚ | ⊚ | ⊚ | ⊚ | ⊚ | 0.22 | 0.22 | 0.22 | 70 | ○ | +1.9 |
| Example 4 | 2.0 | 10.0 | 1.7 | 15 | 2 | ⊚ | ⊚ | ⊚ | ⊚ | ⊚ | ⊚ | ⊚ | ⊚ | ⊚ | ⊚ | 0.21 | 0.21 | 0.19 | 50 | ○ | +1.6 |
| Example 5 | 2.0 | 10.0 | 1.3 | 14 | 1 | ⊚ | ⊚ | ⊚ | ⊚ | ⊚ | ⊚ | ⊚ | ⊚ | ⊚ | ⊚ | 0.21 | 0.21 | 0.21 | 60 | ○ | +1.8 |
| Example 6 | 2.0 | 10.0 | 1.7 | 14 | 1 | ⊚ | ⊚ | ⊚ | ⊚ | ⊚ | ⊚ | ⊚ | ⊚ | ⊚ | ⊚ | 0.21 | 0.21 | 0.20 | 60 | ○ | +1.8 |
| Example 7 | 2.0 | 10.0 | 1.7 | 14 | 1 | ⊚ | ⊚ | ⊚ | ⊚ | ⊚ | ⊚ | ⊚ | ⊚ | ⊚ | ⊚ | 0.21 | 0.21 | 0.20 | 60 | ○ | +1.8 |
| Example 8 | 2.0 | 10.0 | 1.7 | 14 | 1 | ⊚ | ⊚ | ⊚ | ○ | ⊚ | ⊚ | ○ | ⊚ | ⊚ | ○ | 0.20 | 0.20 | 0.20 | 60 | ○ | +1.7 |
| Example 9 | 1.5 | 11.0 | 1.3 | 13 | 1 | ⊚ | ⊚ | ⊚ | ⊚ | ⊚ | ⊚ | ⊚ | ⊚ | ⊚ | ⊚ | 0.21 | 0.21 | 0.20 | 60 | ○ | +2.5 |
| Example 10 | 1.0 | 12.0 | 0.8 | 11 | 1 | ⊚ | ⊚ | ⊚ | ⊚ | ⊚ | ⊚ | ⊚ | ⊚ | ⊚ | ⊚ | 0.22 | 0.22 | 0.21 | 70 | ○ | +3.1 |
| Example 11 | 0.6 | 12.8 | 0.5 | 9 | 1 | ⊚ | ⊚ | ⊚ | ⊚ | ⊚ | ⊚ | ⊚ | ⊚ | ⊚ | ⊚ | 0.24 | 0.23 | 0.23 | 90 | ○ | +3.4 |
| Example 12 | 1.5 | 11.0 | 1.3 | 13 | 1 | ⊚ | ⊚ | ⊚ | ⊚ | ⊚ | ⊚ | ⊚ | ⊚ | ⊚ | ⊚ | 0.21 | 0.21 | 0.20 | 60 | ○ | +2.4 |
| Example 13 | 1.0 | 12.0 | 0.8 | 11 | 1 | ⊚ | ⊚ | ⊚ | ⊚ | ⊚ | ⊚ | ⊚ | ⊚ | ⊚ | ⊚ | 0.22 | 0.22 | 0.21 | 70 | ○ | +3.0 |

TABLE 3

| | Inert particle in layer A | | | | | | | |
|---|---|---|---|---|---|---|---|---|
| | Crosslinked polymer particle A | | | Inert particle B | | Inert inorganic particle C | | |
| | Kind of particle, Average particle diameter (da) (μm) | Content of particle (%) | Apparent Young's modulus of particle (kg/mm²) | Kind of particle, Average particle diameter (db) (μm) | Content of particle (%) | Kind of particle, Average particle diameter (dc) (μm) | Content of particle (%) | Average agglomeration degree of particle (number) |
| Comparative Example 1 | — | — | — | Calcium carbonate 0.6 | 0.2 | θ-Aluminum oxide 0.1 | 0.2 | 4.5 |
| Comparative Example 2 | — | — | — | Calcium carbonate 0.4 | 0.2 | θ-Aluminum oxide 0.1 | 0.2 | 4.5 |
| Comparative Example 3 | Silicone resin 1.2 | 0.01 | 50 | — | — | θ-Aluminum oxide 0.1 | 0.2 | 4.5 |
| Comparative Example 4 | Silicone resin 1.2 | 0.01 | 50 | Calcium carbonate 0.6 | 0.2 | — | — | — |
| Comparative Example 5 | Silicone resin 0.7 | 0.01 | 50 | Calcium carbonate 0.6 | 0.2 | θ-Aluminum oxide 0.1 | 0.2 | 4.5 |
| Comparative Example 6 | Silicone resin 2.0 | 0.03 | 50 | Calcium carbonate 0.6 | 0.2 | θ-Aluminum oxide 0.1 | 0.2 | 4.5 |
| Comparative Example 7 | Silicone resin 1.2 | 0.0005 | 50 | Calcium carbonate 0.6 | 0.2 | θ-Aluminum oxide 0.1 | 0.2 | 4.5 |
| Comparative Example 8 | Silicone resin 1.2 | 0.05 | 50 | Calcium carbonate 0.6 | 0.2 | θ-Aluminum oxide 0.1 | 0.2 | 4.5 |
| Comparative Example 9 | Spherical Silica 1.2 | 0.01 | 200 | Calcium carbonate 0.6 | 0.2 | θ-Aluminum oxide 0.1 | 0.2 | 4.5 |
| Comparative Example 10 | Silicone resin 1.2 | 0.01 | 50 | Calcium carbonate 0.6 | 0.2 | Spherical silica 0.1 | 0.2 | 1.5 |
| Comparative Example 11 | Silicone resin 1.2 | 0.01 | 50 | Calcium carbonate 0.6 | 0.2 | θ-Aluminum oxide 0.1 | 0.2 | 1.7 |
| Comparative Example 12 | Silicone resin 1.2 | 0.01 | 50 | Calcium carbonate 0.6 | 0.2 | θ-Aluminum oxide 0.1 | 0.2 | 25.3 |
| Comparative Example 13 | Silicone resin 1.0 | 0.01 | 50 | Calcium carbonate 0.8 | 0.2 | θ-Aluminum oxide 0.1 | 0.2 | 4.5 |
| Comparative Example 14 | Silicone resin 1.2 | 0.01 | 50 | Calcium carbonate 0.6 | 1.2 | θ-Aluminum oxide 0.1 | 0.2 | 4.5 |
| Comparative Example 15 | Silicone resin 1.2 | 0.01 | 50 | Calcium carbonate 0.6 | 0.2 | θ-Aluminum oxide 0.1 | 0.2 | 4.5 |
| Comparative Example 16 | Silicone resin 1.2 | 0.02 | 50 | Calcium carbonate 0.6 | 0.2 | θ-Aluminum oxide 0.1 | 0.2 | 4.5 |
| Comparative Example 17 | Silicone resin 1.2 | 0.02 | 50 | Calcium carbonate 0.6 | 0.2 | θ-Aluminum oxide 0.1 | 0.2 | 4.5 |

TABLE 4

| | Thickness of Layer A (T_A) μm | Thickness of Layer B μm | T_A/d_a | Ra^A nm | Calender abrasion resistance (class) | Blade abrasion resistance | High speed transportation Scratch resistance | | | High speed transportation abrasion resistance | | | Low speed repeated transportation Scratch resistance | | | Kinetic μk | | | Windability index | Windability | Electromagnetic conversion characteristics C/N |
|---|---|---|---|---|---|---|---|---|---|---|---|---|---|---|---|---|---|---|---|---|---|
| | | | | | | | A | B | C | A | B | C | A | B | C | A | B | C | | | |
| Compara Ex. 1 | 2.0 | 10.0 | — | 14 | 1 | ⊚ | ⊚ | ⊚ | ⊚ | ⊚ | ⊚ | ⊚ | ⊚ | ⊚ | ⊚ | 0.21 | 0.21 | 0.21 | 150 | Δ | +1.9 |
| Compara Ex. 2 | 2.0 | 10.0 | — | 11 | 1 | ⊚ | ⊚ | ⊚ | ⊚ | ⊚ | ⊚ | ⊚ | ⊚ | ⊚ | ⊚ | 0.23 | 0.23 | 0.24 | 200 | x | +2.5 |
| Compara Ex. 3 | 2.0 | 10.0 | 1.7 | 6 | 1 | ⊚ | ⊚ | ○ | ⊚ | Δ | ○ | ⊚ | Δ | ○ | ⊚ | Δ | 0.32 | 0.31 | 0.31 | 140 | Δ | +3.6 |
| Compara Ex. 4 | 2.0 | 10.0 | 1.7 | 14 | 1 | ⊚ | x | x | Δ | ○ | ○ | ○ | x | x | Δ | 0.23 | 0.23 | 0.22 | 60 | ○ | +1.8 |
| Compara Ex. 5 | 2.0 | 10.0 | 2.9 | 14 | 1 | ⊚ | ⊚ | ⊚ | ⊚ | ⊚ | ⊚ | ⊚ | ⊚ | ⊚ | ⊚ | 0.21 | 0.21 | 0.20 | 120 | Δ | +1.8 |
| Compara Ex. 6 | 2.0 | 10.0 | 1.0 | 18 | 4 | Δ | ⊚ | ⊚ | ⊚ | Δ | Δ | ○ | ⊚ | ⊚ | ⊚ | 0.23 | 0.23 | 0.22 | 50 | ○ | −0.7 |
| Compara | 2.0 | 10.0 | 1.7 | 14 | 1 | ⊚ | ⊚ | ⊚ | ⊚ | ⊚ | ⊚ | ⊚ | ⊚ | ⊚ | ⊚ | 0.21 | 0.21 | 0.20 | 110 | Δ | +1.8 |

TABLE 4-continued

| | Thickness of Layer A (T_A) μm | Thickness of Layer B μm | T_A/d_a | Ra^A nm | Calender abrasion resistance (class) | Blade abrasion resistance | High speed transportation Scratch resistance A | B | C | abrasion resistance A | B | C | Low speed repeated transportation Scratch resistance A | B | C | Kinetic μk A | B | C | Windability index | Windability | Electromagnetic conversion characteristics C/N |
|---|---|---|---|---|---|---|---|---|---|---|---|---|---|---|---|---|---|---|---|---|---|
| Ex. 7 Compara Ex. 8 | 2.0 | 10.0 | 1.7 | 17 | 4 | x | ⊚ | ⊚ | ⊚ | ○ | ○ | | ⊚ | ⊚ | ⊚ | 0.19 | 0.19 | 0.18 | 40 | ○ | −0.1 |
| Compara Ex. 9 | 2.0 | 10.0 | 1.7 | 14 | 4 | △ | △ | △ | △ | x | △ | △ | x | ○ | ○ | 0.22 | 0.22 | 0.28 | 60 | ○ | +1.8 |
| Compara Ex. 10 | 2.0 | 10.0 | 1.7 | 14 | 1 | ⊚ | △ | △ | △ | △ | △ | △ | △ | △ | △ | 0.22 | 0.22 | 0.24 | 60 | ○ | +1.8 |
| Compara Ex. 11 | 2.0 | 10.0 | 1.7 | 14 | 1 | ⊚ | △ | △ | △ | △ | △ | △ | △ | △ | △ | 0.24 | 0.26 | 0.23 | 60 | ○ | +1.8 |
| Compara Ex. 12 | 2.0 | 10.0 | 1.7 | 15 | 2 | ○ | △ | x | x | △ | △ | x | △ | x | x | 0.27 | 0.27 | 0.28 | 60 | ○ | +1.5 |
| Compara Ex. 13 | 2.0 | 10.0 | 2.0 | 16 | 1 | ⊚ | ⊚ | ⊚ | ○ | ⊚ | ⊚ | ○ | ⊚ | ⊚ | ○ | 0.21 | 0.21 | 0.22 | 110 | △ | +1.3 |
| Compara Ex. 14 | 2.0 | 10.0 | 1.7 | 26 | 5 | x | ○ | ○ | ○ | ○ | △ | ○ | ○ | ○ | ○ | 0.20 | 0.20 | 0.21 | 80 | ○ | −2.0 |
| Compara Ex. 15 | 0.3 | 13.4 | 0.3 | 7 | 4 | △ | △ | △ | △ | △ | △ | △ | △ | △ | △ | 0.30 | 0.30 | 0.32 | 190 | x | +3.7 |
| Compara Ex. 16 | 4.0 | 6.0 | 3.3 | 17 | 3 | △ | ⊚ | ⊚ | ⊚ | ○ | ○ | ⊚ | ⊚ | ⊚ | ⊚ | 0.20 | 0.20 | 0.19 | 50 | ○ | 0 |
| Compara Ex. 17 | 14.0 | — | 11.7 | 17 | 3 | △ | ⊚ | ⊚ | ⊚ | ○ | ○ | ⊚ | ⊚ | ⊚ | ⊚ | 0.20 | 0.20 | 0.19 | 50 | ○ | 0 |

What is claimed is:

1. A biaxially oriented laminated polyester film for magnetic recording medium, the biaxially oriented laminated polyester film comprising a polyester layer A containing fine particles on at least one surface of a polyester layer B, wherein the fine particles in the polyester layer A are composed of 0.001 to 0.03% by weight of crosslinked polymer particles (a) having an average particle diameter (da) of 0.9 to 1.6 μm, 0.1 to 0.8% by weight of inert particles (b) having an average particle diameter (db) of 0.4 to 0.8 μm and 0.05 to 1.0% by weight of inert inorganic particles (c) having an average particle diameter (dc) of 0.01 to 0.3 μm and a Mohs hardness of 7 or above, wherein the ratio of the thickness TA (μm) of the polyester layer A to the average particle diameter da (μm) of the crosslinked polymer particle (TA/da) is in the range of from 0.4 to 2.0, the center line average roughness RaA on the surface of the polyester layer A is from 8 to 18 nm, and the windability index of the polyester film is 100 or lower at a take-up speed of 200 m/min.

2. The biaxially oriented laminated polyester film for magnetic recording medium described in claim 1 wherein the crosslinked polymer particle (a) has an apparent Young's modulus of from 10 to 100 kgf/mm$^2$.

3. The biaxially oriented laminated polyester film for magnetic recording medium described in claim 1 wherein the average particle diameter (da) of the crosslinked polymer particles (a) is from 1.0 to 1.5 μm.

4. The biaxially oriented laminated polyester film for magnetic recording medium described in claim 1 wherein the content of the crosslinked polymer particles (a) is from 0.003 to 0.025% by weight.

5. The biaxially oriented laminated polyester film for magnetic recording medium described in claim 1 or 2 wherein the crosslinked polymer particle (a) is at least one kind of particle selected from crosslinked silicone resin and crosslinked polystyrene.

6. The biaxially oriented laminated polyester film for magnetic recording medium described in claim 1 wherein the average particle diameter (db) of the inert particle (b) is from 0.4 to 0.7 μm.

7. The biaxially oriented laminated polyester film for magnetic recording medium described in claim 1 or 6 wherein the content of the inert particles (b) is from 0.15 to 0.7% by weight.

8. The biaxially oriented laminated polyester film for magnetic recording medium described in claim 1 or 6 wherein the inert particle (b) is calcium carbonate.

9. The biaxially oriented laminated polyester film for magnetic recording medium described in claim 1 wherein the average particle diameter (dc) of the inert inorganic particles (c) is from 0.03 to 0.25 μm.

10. The biaxially oriented laminated polyester film for magnetic recording medium described in claim 1 or 9 wherein the content of the inert inorganic particle (c) is from 0.1 to 0.7% by weight.

11. The biaxially oriented laminated polyester film for magnetic recording medium described in claim claim 1 or 9 wherein the inert inorganic particles (c) is at least one kind of agglomerated particle selected from aluminum oxide and spinel-type oxide, and having an average agglomeration degree of from 2 to 20.

12. The biaxially oriented laminated polyester film for magnetic recording medium described in claim 1 wherein the ratio of the thickness TA ($\mu$m) of the polyester layer A to the average particle diameter (da) ($\mu$m) of the crosslinked polymer particle (a) (TA/da) is from 0.6 to 1.9.

13. The biaxially oriented laminated polyester film for magnetic recording medium described in claim 1 wherein the laminated film has a Young's modulus of 400 kg/mm$^2$ or above in longitudinal direction and 500 kg/mm$^2$ or above in lateral direction.

14. The biaxially oriented laminated polyester film for magnetic recording medium described in claim 1 wherein the total thickness of the laminated film is from 5 to 25 $\mu$m.

15. The biaxially oriented laminated polyester film for magnetic recording medium described in claim 1 wherein the polyester is a polyethylene terephthalate or a polyethylene-2,6-naphthalate.

* * * * *